(12) United States Patent
Martinez et al.

(10) Patent No.: US 7,796,296 B2
(45) Date of Patent: Sep. 14, 2010

(54) PERSONALIZED COLOR REPRODUCTION

(75) Inventors: Oscar Martinez, Castelldefels (ES); Jordi Arnabat Benedicto, L'Arboç (ES); Steven J Simske, Fort Collins, CO (US); Eduardo Amela, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 11/706,275

(22) Filed: Feb. 15, 2007

(65) Prior Publication Data
US 2007/0195345 A1 Aug. 23, 2007

(30) Foreign Application Priority Data
Feb. 16, 2006 (EP) .................................. 06110035

(51) Int. Cl.
*G06F 15/00* (2006.01)
(52) U.S. Cl. .................... 358/1.9; 358/518; 358/527; 358/2.1
(58) Field of Classification Search ............... 358/1.9, 358/1.13, 1.15, 500, 296, 518, 527, 2, 1; 715/961; 719/321; 345/581, 589
See application file for complete search history.

(56) References Cited

U.S. PATENT DOCUMENTS

| 4,979,031 | A | 12/1990 | Tsuboi et al. |
| 5,495,539 | A | 2/1996 | Sieverding |
| 5,809,366 | A | 9/1998 | Yamakawa et al. |
| 5,987,165 | A | 11/1999 | Matsuzaki et al. |
| 5,995,714 | A | 11/1999 | Hadley et al. |
| 7,023,448 | B1 * | 4/2006 | Danciu .................. 358/500 |
| 2005/0219561 | A1 * | 10/2005 | Haikin .................. 358/1.9 |
| 2006/0098220 | A1 * | 5/2006 | Oh et al. .............. 358/1.9 |

FOREIGN PATENT DOCUMENTS

| EP | 0 582 421 A | 2/1994 |
| EP | 0 685 962 A | 12/1995 |
| EP | 1 206 124 A | 5/2002 |
| WO | WO 92/20184 A | 11/1992 |

\* cited by examiner

*Primary Examiner*—Kimberly A Williams

(57) ABSTRACT

A method is provided of personalizing color reproduction of an output device by determining a user-specific color mapping. A user is enabled to individually select different color reproductions of a plurality of different test images according to the user's preferences, wherein the different color reproductions are associated with different color mappings. The test images are reproduced by the output device or a display device simulating the output device. The user-specific color mapping is determined by combining the color mappings of the selected color reproductions.

24 Claims, 12 Drawing Sheets

(52/49/16) R"G"B"
(50/53/25) CIE-XYZ
(42/55/35) R'G'B'

Fig. 5

|  | CURRENT PICK | MORE MAGENTA | MORE GREEN | MORE YELLOW | MORE BLUE | MORE CYAN | MORE RED | CURRENT PICK | LIGHTER | DARKER |
|---|---|---|---|---|---|---|---|---|---|---|
| IMAGE B |  |  |  |  | ☑ |  |  |  |  |  |
| IMAGE G |  |  |  |  |  | ☑ |  |  |  |  |
| IMAGE H |  |  |  |  | ☑ |  |  |  |  |  |
| IMAGE J |  |  |  |  | ☑ |  |  |  |  |  |
| IMAGE M |  |  |  | ☑ |  |  |  |  |  |  |
|  | LUT 7.2.0 | LUT 7.2.5 | LUT 7.2.6 | LUT 7.2.3 | LUT 7.2.4 | LUT 7.2.1 | LUT 7.2.2 | LUT 7.2.0 | LUT 7.2.7 | LUT 7.2.8 |

Fig. 7
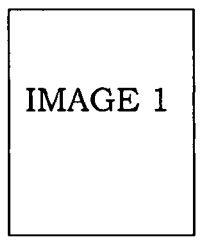
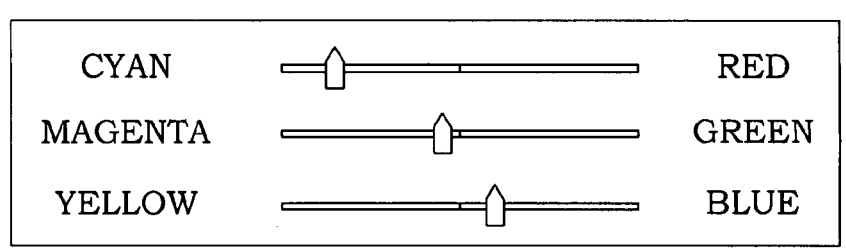
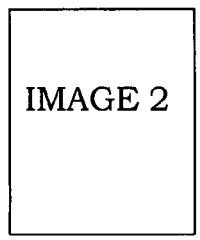
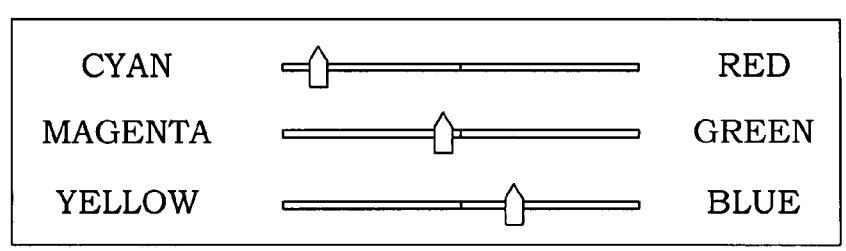
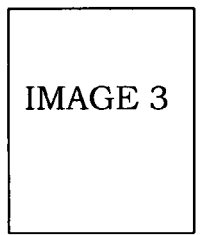
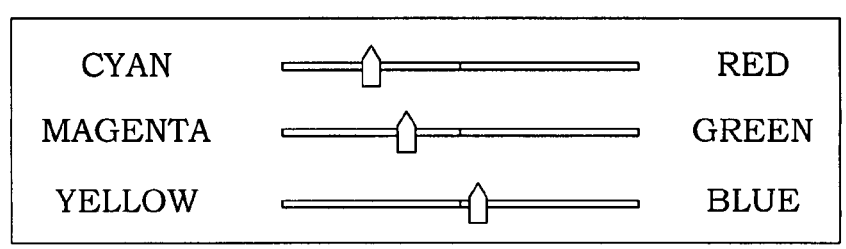

PERSONALIZED COLOR REPRODUCTION

CROSS-REFERENCE TO RELATED PATENT APPLICATIONS

This application claims priority from European patent application number 06110035.0, filed on Feb. 26, 2006. The entire content of the aforementioned application is incorporated herein by reference

FIELD OF THE INVENTION

The present invention generally relates to methods and computer program products for color management of output devices, and for example, to methods and computer program products for color management with a view to personalizing color reproduction of output devices for individual users.

BACKGROUND OF THE INVENTION

Digital cameras are becoming affordable for an increasing number of customers and most of them wish to view their photos on a computer screen or print them in reasonable quality with a commercially available printer. Customers, however, are sometimes not pleased with the result they get since the color reproduction on a screen or on a printout falls short of their personal expectations about how colors should be reproduced. Even if the colors are faithfully reproduced, which can be measured by a spectrophotometer, psychophysical tests have shown that users favor color reproduction according to their personal preferences. The problem of dissatisfying color reproduction is not restricted to the field of digital photography but most complaints are indeed registered at imaging companies in this realm since users are unwilling to accept photographs of inferior quality.

The fundamental basis for all color reproduction is the three-channel design of the human retina which means that the human eye has three types of color sensors (corresponding roughly to red, green and blue). Receptors of the human eye, also referred to as photoreceptors, are firstly divided into two types, called rods and cones because of their shapes. Rods provide vision in low-light conditions, such as night vision, whereas cones function in bright light conditions. While all the rods in the retina are essentially the same, the cones are further divided into three types of the above-mentioned color sensors. One responds primarily to the long wavelengths (red cones) of light and has little response to the middle or short wavelengths. One responds primarily to the middle wavelengths (green cones), and the third responds to the short wavelengths (blue cones). This trichromatic structure of the human retina is also referred to as "trichromacy". The importance of trichromacy in terms of color management is that one can simulate almost any color by using just three well-chosen primary colors of light (see, for example: "Real World Color Management"; p. 16-20; Fraser, B.; Murphy, C.; Bunting, F.; Peachpit Press; 2003).

It is the trichromatic structure of the human retina that makes possible what is known as additive primary colors. If one chooses three light sources with overlapping spectra that divide up the visible spectrum roughly into thirds, each one adds wavelengths that tickle one or more of the eye's three receptors. If the spectrum is divided into thirds, one gets three light sources that are called red, green and blue. Starting from black (no wavelengths), the three colors add wavelengths— hence "additive color"—until one gets white (all wavelengths in even proportions).

Trichromacy is also the source of subtractive primary colors—cyan, magenta and yellow. Rather than adding wavelengths to black, they act to subtract wavelengths from an otherwise white source of light. In other words, the term "cyan ink" is just a name for "long-wavelength-subtractor", or simply "red-subtractor"—it subtracts long (red) wavelengths from white light (such as that reflected from otherwise blank paper). Similarly, magenta ink is a "medium-wavelength-subtractor", or a "green-subtractor". And yellow is a "short-wavelength-subtractor" or a "blue-subtractor".

The notion of additive and subtractive primary colors leads to two color spaces. A color space allows any color to be defined in terms of the amount of each primary color it contains. A color may hence be represented as coordinates in a three- (or any other multi-) dimensional space, whereby each primary color forms one of the axes. The axes (the primary colors) are also referred to as channels.

The additive primary colors span up a color space which is called red-green-blue color space, usually abbreviated as RGB color space or RGB color system. Colors of the RGB color space are generated by additively mixing these three primary colors. Additive color mixing means superimposing the three primary colors by projection. If the three primary colors are superimposed in equal portions, they add up to the mixed color white. Not only does the RGB color system occur in nature, like in the retina of the human eye, but it is also found in technology. Color projectors generate images by superimposing red, green and blue beams of light. Displaying color on a monitor is done by spraying streams of electrons that strike phosphors. Phosphors are chemical and mineral compounds that emit light when they are struck (the technical term is "excited") by a beam of electrons. Color monitors use three different kinds of phosphors painted on the inside of the faceplate of a color monitor that emit red, green and blue light, respectively. By varying the strength of the electron beam, phosphors are excited to emit more or less red, green, and blue light, and hence produce different colors. One should note, that the precise color that a monitor produces depends on the type of phosphors used, its age, the specific circuitry and other characteristics of the monitor. Therefore, it is highly unlikely that any two monitors will produce the same color from the same signal, even if they are two apparently identical monitors. Typically, one channel of the RGB system is encoded by 8 bits, which leads to 256 tone levels per channel. Hence, three channels are encoded by 24 bits and may represent 256×256×256=16.8 million colors. Besides color monitors, also scanners and digital cameras work with the RGB color system.

Subtractive primary colors cyan, magenta and yellow span up a CMY color space. The colors of the CMY color space are produced by subtractively mixing these three primary colors. Subtractive color mixing means that pigments of the three primary colors are mixed. Cyan, magenta and yellow are the complementary colors of red, green and blue. The pigments absorb the red, green and blue portions of the light and appear therefore in the corresponding complementary colors. If the three primary colors are mixed in equal portions, all color portions are absorbed and the mixture appears black. Subtractive color mixing is typically applied with inkjet color printers. By using toner colors cyan, magenta and yellow, all colors of the CMY color space may be reproduced.

Practical experiences show, however, that the color black does not get the necessary intensity by mixing the three subtractive primary colors. For this reason, color printers usually feature an additional container with black ink. This printing system is referred to as four color printing in the CMYK system. This system has two disadvantages: pixel graphics need more memory space in this color system (32 bits per pixel instead of 24 bits) and further, the color system is not unambiguous. The color black is redundant and may be represented by the other three color components. This leads to undesired results when printing shades of gray.

Strictly speaking, the CMYK values used in a printing device and the RGB values used in color monitors do not refer to colors, but rather specify the amounts of the different colorants (ink, toners, phosphors etc.) which are used to print in a pixel or a dot. This means two things:
   (a) The same set of RGB or CMYK numbers will produce different colors on different devices (or on the same device with different paper, if it is a printer or a press).
   (b) To produce the same color on different devices, the RGB or CMYK numbers sent to each device have to be modified.

Therefore, one should note that neither RGB nor CMYK numbers are descriptions of colors. Rather, they are control signals, or instructions that make devices like monitors and printers produce something that is experienced as color.

Device-independent color models have been defined to enable colors to be characterized in a device-independent way. The CIE (Commission International de L'Eclairage, or the International Commission on Illumination) has defined spectral response curves (CIE color matching functions) which correspond to the photoreceptor sensitivities of a standard observer (see, for example, C. Poynton, "A Technical Introduction To Digital Video", John Wiley & Sons, Inc., 1996, p. 123, FIG. 7.4). These values of the standard observer's color matching functions are called CIE XYZ; the corresponding color space is therefore called CIE XYZ color space. As the CIE XYZ representation refers to colors perceived by the standard observer, it is device-independent, in contrast to an RGB or CMYK representation which specifies amounts of different colorants in a particular printing or displaying device, which is therefore device-dependent.

As mentioned above, the numbers in a device-dependent representation (e.g. a CMYK representation) do not really represent color. Instead, they represent the amounts of colorants (e.g. the amounts of the different inks in a printing device) required to make a color. The same set of CMYK numbers will produce different colors on different devices (and media). In order to produce the same color on different devices (or different media), the color may be expressed in a device-independent color space (such as CIE XYZ), and then converted into the device-dependent (and media-dependent) color representation that specifies what amounts of colorants are to be applied in order to reproduce the desired color on the particular reproduction device and media. The mappings which correlate device-independent color values with device-dependent color values are called transforms and their data representations are called profiles. A transform that converts color values in a device-independent representation into a device-dependent representation is known as the "forward transform", and a transform that converts color values from the device-dependent representation into a device-independent representation is known as the "backwards transform". As a device-independent representation is also used as a "profile connection space", or PCS, the forward and backwards transforms are also called the PCS-to-device transform and the device-to-PCS transform (see Fraser, pp. 99-110). In principle, a profile may be in the form of a matrix, and a transform may be performed by a matrix multiplication (e.g. by multiplying the PCS components of a color to be reproduced (e.g. its CIE XYZ components) with the forward matrix). However, for more complex devices, such as printers, the profiles are typically in the form of lookup tables (LUTs). A LUT is a table of numbers that provides, for certain input values (colors represented in an input color space), the corresponding output values (the corresponding colors represented in an output color space). The tables that specify the backwards transform are known as the AtoB tables, while the tables that specify the forward transform are known as BtoA tables (see Fraser, p. 102).

A profile reflects characteristics of a device and therefore has to be made for each device individually. Typically, the process of making a color profile for a color monitor includes the following steps:
   (i) A stimulus, which is also referred to as a profiling target, is sent in the form of predefined RGB values to the monitor. A profiling target is a set of RGB values, for example all combinations of 0%, 10%, 20%, 40%, 70% and 100% of each colorant in all possible combinations.
   (ii) The monitor displays the predefined RGB values and the output, which is also called response in contrast to the stimulus, is measured by an instrument, such as a spectrophotometer, that captures the device-independent CIE XYZ values.
   (iii) A profile is constructed that maps RGB values onto their CIE XYZ values. The profile can tell what actual color will result from a given set of RGB values.
   (iv) The LUT of the profile is reversed and can also tell, what RGB values are needed to display a specific color.

Similarly, a profile is generated for a printer by sending predefined CMYK values (profiling target) to a printer and printing them. A profiling target contains patches with 0%, 10%, 20%, 40%, 70% and 100% of each ink in all possible combinations. Then, the CIE XYZ values of the printed output are measured and a profile is built which maps the predefined CMYK values onto the measured CIE XYZ values. The profile is reversed to indicate which amounts of CMYK colorants are needed to obtain a specific color.

Making a profile for a scanner differs only in that the measurements are usually already done. The stimulus in this case is a scanning target that is typically supplied together with the scanner by the manufacturer. Scanning targets are always accompanied by a data file that records the CIE XYZ values of the color patches. These values have been measured by the manufacturer by means of a spectrophotometer. The target is scanned and the scanner generates its own RGB values out of the scanning target. A profile is constructed that maps the scanner's RGB values onto the CIE XYZ values. The profile can tell what actual color will result from a given set of RGB values. The LUT of the profile is reversed and can also tell, what RGB values are needed to display a specific color.

One should keep in mind that profiles are limited in their capability to define a transformation from one color space into another. When making a profile, it is practically impossible to send all possible signal combinations to the output device, measure the output and define a precise mapping for all input values (i.e. all signal combinations) into an output color space. Even if the signals of each channel of a CMYK printer were incremented by 1%, this would lead to 10.0000.000 combinations resulting in the same amount of color patches. Measuring the patches and storing that many sample points in a LUT would require gigabytes of storage space. Therefore, interpolation is unavoidable when creating a profile and when using it. Interpolation is performed by a color management module (CMM) and there are different ways of interpolating. If an input value is not stored in the input data points of a LUT, the input data points closest to the input value and the distances from the input value to the input data points are determined. Then the corresponding output data points are looked up, and an interpolation is made between them, taking the reciprocals of the distances of the input value to the input data points as weighting factors of the corresponding output data points.

Another limitation arises from the fact that different imaging devices have different color gamuts. The color gamut of a device represents the range of colors that a device can reproduce. If an input device can capture colors that an output device cannot reproduce, then there is no way of attaining faithful color reproduction by means of applying profiles. If a printer, for example, cannot reproduce a certain shade of red, which a scanner can capture, then the printer cannot be made reproducing said shade of red by applying one or more profiles to it.

The third limitation is that a profile is only as accurate as the measurements on which it is based. A profile is a snapshot of the way the device was behaving when the measurements were captured. The majority of imaging devices change their behavior over time, so that steps have to be taken to ensure that the device does not change its behavior.

Typically, profiles are generated during the manufacturing process of an imaging device and are stored in form of an LUT inside the firmware of the imaging device since a profile inherently belongs to one device.

Color profiles are not only device-dependent, but also media-dependent. In the case of an inkjet printer, this means that different profiles are generated for different types of paper or transparencies.

From a mathematic perspective, each imaging device may represent an amount of colors which are represented in a color space. A color space is spanned by a set of linear independent color vectors (which are referred to as channels above) which is called base. Strictly speaking, the bases of these image spaces are different for each pair of imaging devices so that profiles are needed to define a transformation which says how one and the same color is represented with regard to two different bases. One should note that representing one and the same color with regard to different bases is the aim of color management in the realm of faithful color reproduction.

U.S. Pat. No. 5,311,212 discloses a color selection system for automatically generating a palette of coordinated, harmonious, and aesthetically pleasing colors based on a chosen key color. The colors of the palette are derived by symmetrically manipulating the chosen key color in a uniform color space. The system is based on known color theories for selecting harmonious colors. The selection of colors is restricted to functional colors which, in contrast to reference colors, only have symbolical function and therefore may be variable. Reference colors are colors of naturally occurring objects in the human perceptual world, such as colors of skin, grass and the sky, and require a close match to colors perceived in nature.

U.S. Pat. No. 5,254,978 discloses a reference color selection system for generating a palette of calorimetrically measured colors. A database stores calorimetrically measured colors which occur in nature. A mixing function allows the creation of new colors by applying a linear interpolation on two colors representing the ends of emerging new intermediate colors. The system, however, stores colors and creates new colors but does not apply the colors to an image.

U.S. Pat. No. 6,618,170 discloses a color printer control system comprising a user interface for shifting color hue. A color spectrum is displayed and the user can move a slide bar relative to the color spectrum. Thereby, a shift in color hue is defined which is also displayed in an image representation, such as a photograph, which changes according to the adjusted color hue. The system only allows the color hue for each image to be adjusted individually but does make generalizations concerning the user's color preferences based on several color adjustments made by the user in regard to several images.

U.S. Pat. No. 6,166,719 discloses a system, in which a represented image is adjusted in response to a user selecting an adjustment. If several adjustments are applied in sequence, they are always applied to a copy of the original image and not to an image, to which adjustments have been applied. Therefore, no information is lost, which could occur if a user first brightened the image so that the image actually disappeared and then wanted to darken the image again. The adjustments are initially displayed in a further image and are only applied to the original image if the user approves of the adjustments.

SUMMARY OF THE INVENTION

A method is provided of personalizing color reproduction of an output device by determining a user-specific color mapping. A user is enabled to individually select different color reproductions of a plurality of different test images according to the user's preferences, wherein the different color reproductions are associated with different color mappings. The test images are reproduced by the output device or a display device simulating the output device. The user-specific color mapping is determined by combining the color mappings of the selected color reproductions.

According to another aspect, a computer system is provided for personalizing color reproduction of an output device by determining a user-specific color mapping. The computer system is programmed to enable a user to individually select different color reproductions of a plurality of different test images according to the user's preferences, wherein the different color reproductions are associated with different color mappings. The test images are reproduced by the output device or a display device simulating the output device. The user-specific color mapping is determined by combining the color mappings of the selected color reproductions.

According to another aspect, a computer program product is provided which is either in the form of a machine-readable medium with program code stored on it, or in the form of a propagated signal including a representation of program code. The program code is arranged to carry out a method, when executed on a computer system, of personalizing color reproduction of an output device by determining a user-specific color mapping. A user is enabled to individually select different color reproductions of a plurality of different test images according to the user's preferences, wherein the different color reproductions are associated with different color mappings. The test images are reproduced by the output device or a display device simulating the output device. The user-specific color mapping is determined by combining the color mappings of the selected color reproductions.

According to another aspect, a method is provided of personalizing color reproduction of an output device by determining user-specific content-related color mappings. At least one test image is segmented into content-related image parts. The user is enabled to select preferred color reproductions, and the at least one test image is reproduced by the output device or a display device simulating the output device. A user-specific color mapping based on the user's selection of preferred color reproductions is individually determined for the different content-related image parts.

According to another aspect, a computer system is provided for personalizing color reproduction of an output device by determining user-specific content-related color mappings. The computer system is programmed to segment at least one test image into content-related image parts. The user is enabled to select preferred color reproductions, and the at least one test image is reproduced by the output device or a display device simulating the output device. A user-specific color mapping based on the user's selection of preferred color reproductions is individually determined for the different content-related image parts.

According to another aspect, a computer program product is provided which is either in the form of a machine-readable medium with program code stored on it, or in the form of a propagated signal including a representation of program code. The program code is arranged to carry out a method, when executed on a computer system, of personalizing color reproduction of an output device by determining a user-specific color mapping. At least one test image is segmented into content-related image parts. The user is enabled to select preferred color reproductions, and the at least one test image is reproduced by the output device or a display device simulating the output device. A user-specific color mapping based on the user's selection of preferred color reproductions is individually determined for the different content-related image parts.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 5 schematically shows selection of color reproductions of different test images, according to embodiments of the invention;

FIG. 7 illustrates a selection of color reproductions from a continuous set of color reproductions by means of sliders, according to embodiments of the invention;

The drawings and the description are of embodiments of the invention and not of the invention itself.

DESCRIPTION OF THE PREFERRED EMBODIMENTS

Figure 1:
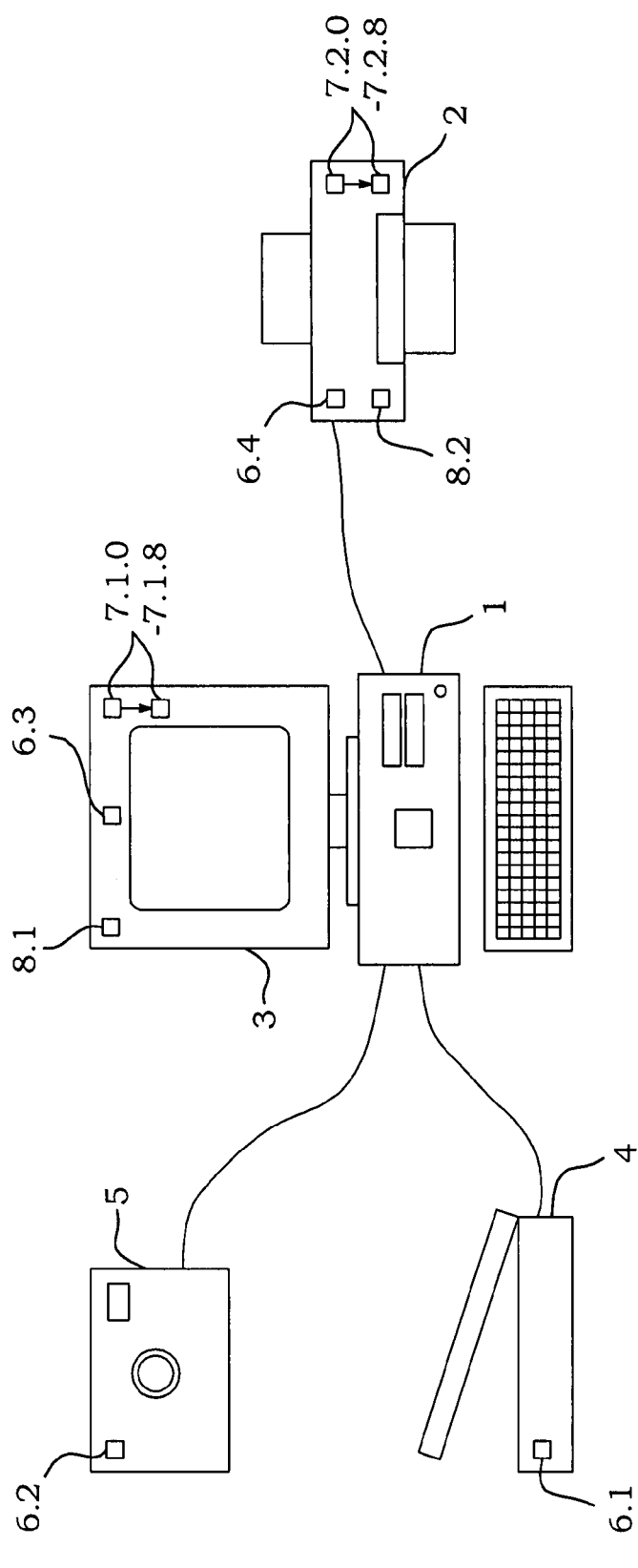
FIG. 1 shows an IT infrastructure including a personal computer with color input and output devices connected to it for personalizing color reproduction, according to embodiments of the invention.

FIG. 1 shows an IT infrastructure including a personal computer with input and output devices connected to it for personalizing color reproduction of an output device. However, before proceeding further with the description of FIG. 1, a few items of the embodiments will be discussed.

In some of the embodiments, color reproduction of an output device is personalized by determining a user-specific color mapping. A user is enabled to individually select different color reproductions of a plurality of different test images according to the user's preferences, wherein the different color reproductions are associated with different color mappings. The test images are reproduced by the output device or a display device simulating said output device. The user-specific color mapping is determined by combining the color mappings of the selected color reproductions.

In the section "background of the invention", issues of color management were discussed that focused on preserving the original color of an image when first scanning and then printing it. This approach does not necessarily satisfy the user best, because many users prefer color reproductions according to their personal preferences rather than faithful color reproductions. Therefore, the present invention aims to provide the user with color reproductions that suit her/his wishes instead of reproducing color as faithfully as possible. That means that beside the color mappings that are necessary to accomplish faithful color reproduction, a second sort of user-specific color mappings are introduced that are responsible for a subjective color transformation which satisfies the color preferences of the user.

In some of the embodiments, the user selects the same color reproduction for all test images presented to him/her. Then, the color mapping associated with the color reproduction is the user's preferred color mapping. However, a user may also select different color reproductions for different test images. Then, for example, a combination of the selected color mappings (more precisely: the color mappings of the corresponding selected color reproductions) yields a color mapping which is considered as the user-specific color mapping. In some of the embodiments, the combination of color mappings is obtained by averaging the color mappings. The color mappings are often represented by means of LUTs (lookup tables) referring to a certain color space. In order to obtain a useful result when averaging LUTs, a color space needs to be used in which the average of two colors corresponds to a color which is also perceptually between the two colors. This property of color spaces is referred to as "perceptually uniform".

In some of the embodiments, a combination of the color mappings of the selected reproductions is obtained by applying a weighted average to the different color mappings.

In some of the embodiments, the different test images are reproduced by the output device in different default color reproductions. The default color reproductions correspond to default color mappings which refer to a (consecutive) translation in the color gamut for a certain, discrete offset in some directions. A default color mapping may, for example, render a test image more green or red. The user is then enabled to select for each test image her/his preferred color reproduction. In some of the embodiments, the default color mappings and the determined user-specific color mapping are pre-stored inside firmware of the output device, whereas in other embodiments, the color mappings, represented as LUTs, are part of the device driver of the output device whose output is to be personalized.

In other embodiments, the user is enabled to select color reproductions for the individual test images from a set of continuous color reproductions. Therefore, in some of the embodiments, the color reproductions of the different test images are selected by means of sliders which transform the color reproductions of the test images when shifted. In these embodiments, a user selects for each of the test images her/his preferred color reproduction by means of shifting a slider and thereby translating the color reproduction of the test image in the color gamut.

In some of the embodiments, the test images are a set of fixed images which are provided by the manufacturer of the output device together with the driver software of the output device, whereas in other embodiments, the test images are personal images by means of which the user personalizes color reproduction of an output device according to her/his preferences. In these embodiments, the user selects personal images as test images that he/she wants to use for determining her/his preferred color reproduction. As the user has previous knowledge of the test images (e.g. because he/she has captured them and can therefore compare the color reproduction with the scene in reality), the user's selection of color reproductions will give more information about her/his color preferences than would be gained by providing the user with fixed test images.

In some of the embodiments, the output device is a color printer. The user is enabled to print the test images with the printer and select the preferred color reproductions, for example by pressing a button in a graphical user interface displayed on a monitor or by pressing a button of the color printer. In other embodiments, the test images are additionally shown on a monitor, (however, the color reproduction of the monitor usually differs from the color reproduction of the color printer so that only the color reproduction of the printer is decisive for selecting preferred color reproductions). In yet other embodiments, the output device whose color reproduction is to be personalized is also a printer, but instead of printing the test images, a color monitor simulates the color reproduction of the printer so that the user is enabled to select her/his preferred color reproductions by means of the color monitor without having to print the test images with the color printer.

In some of the embodiments, the output device whose color reproduction is to be personalized is a color monitor, the test images are reproduced on the color monitor and the user is enabled to select her/his preferred color reproductions in a user interface displayed by the color monitor.

In the embodiments mentioned above; one color mapping is determined on the basis of selecting color mappings for a set of test images, whereas in the following embodiments, color mappings are determined in relation to content-related image parts of one or several test images.

In some of the embodiments, color reproduction of an output device is personalized by determining user-specific content-related color mappings. To this end, at least one test image is segmented into content-related image parts. A content-related image part of an image is, for instance, the foreground, background or text zones of an image. The user is enabled to select preferred color reproductions, whereby in some of the embodiments, the user selects her/his preferred color reproductions with regard to each test image as a whole, whereas in other embodiments, the user selects her/his preferred color reproductions with regard to individual, segmented, content-related parts of the image. The at least one test image is reproduced by the output device or a display device simulating the output device. For the different content-related image parts, a color mapping is individually determined on the basis of the user's selection of preferred color reproductions.

Figure 3:
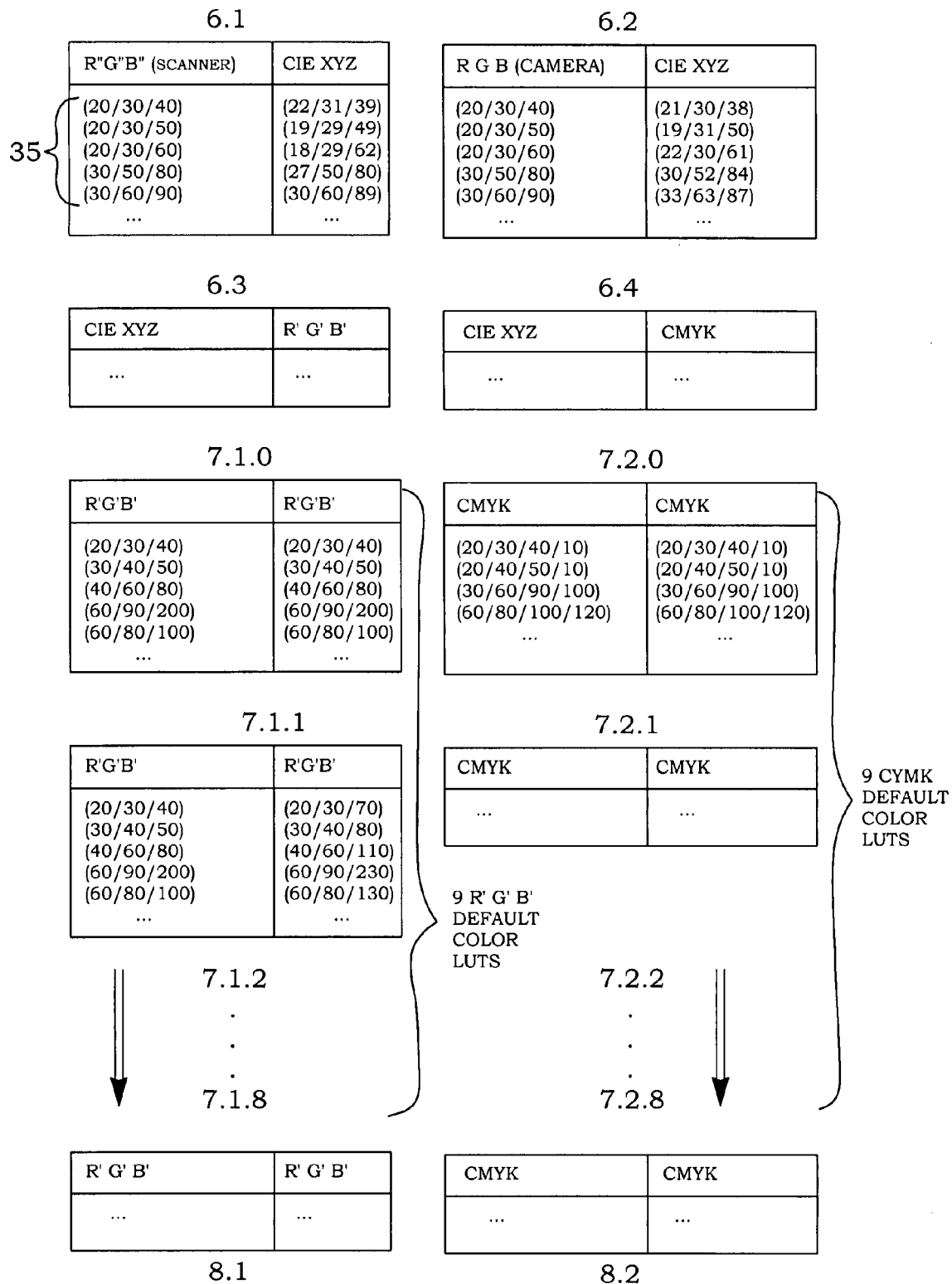
FIG. 3 shows device-dependent, default and user-specific LUTs, according to embodiments of the invention.

In some of the embodiments, segmentation is performed by a zoning analysis engine (i.e. a program performing a zoning analysis) in order to distinguish text zones from non-text zones, or, in other words, to perform a content segregation, or segmentation. As will be explained in more detail below, the text in the text zones found in the zoning analysis is later used in one or more activities to improve the text image quality, use of a font-size-dependent spatial resolution and/or choice of a print direction transverse to a main reading direction. Zoning analysis algorithms are known to the skilled person, for example, from U.S. Pat. No. 5,767,978. For example, a zoning analysis used in some of the embodiments identifies high-contrast regions ("strong edges"), which are typical for text content and low-contrast regions ("weak edges") typical for continuous-tone zones, such as pictures or graphics. In some embodiments, the zoning analysis calculates the ratio of strong and weak edges within a pixel region; if the ratio is above a predefined threshold, the pixel region is considered as a text region which may be combined with other text regions to form a text zone. Other zoning analyses count the dark pixels or analyze the pattern of dark and bright pixels within a pixel region in order to identify text elements or text lines. The different types of indication for text, such as the indicator based on strong edge recognition and the one based on background recognition, may be combined in the zoning analysis. As a result of the zoning analysis, text zones are found and identified in the bitmap-input image, e.g. as illustrated in FIG. 3 of U.S. Pat. No. 5,767,978. Typically, but not necessarily, the zoning analysis is tuned such that text embedded in pictures is not considered as a text zone, but is rather assigned to the picture in which it is embedded.

In some of the embodiments, a plurality of test images are segmented into their content-related image parts. And, as mentioned above, the user is enabled to select color reproductions for each of the different images, considered as a whole. In these embodiments, the user is not aware of the internal segmentation of the test images since she/he selects her/his preferred color reproduction of the test image as a whole. In these embodiments, user-specific content-related color mappings are generated by means of inverse calculation. For example, if a user selects color mapping LUT-1, for an image having (70%, 30%) of the different content-related image parts (for example 70% of image part foreground and 30% of image part background) and color mapping LUT-2 for an image having (60%, 40%) of the different content-related image parts, then two basic LUTs have to be calculated, e.g. (100%,0%) and (0%,100%) by means of which a user-specific LUT for any image (i.e. with any percentages of foreground and background) to be produced may be obtained.

In other embodiments, the at least one test image is segmented and each content-related image part of the at least one test image is individually presented to a user who then individually selects for each content-related image part her/his preferred color reproduction. In these embodiments, the user is aware of the segmentation of the test images since she/he selects for each content-related image part her/his preferred color production. It should be mentioned that in these embodiments, one test image may be enough to determine a color mapping for each content-related image part, whereas in the embodiments in which inverse calculation is performed, several test images are needed.

In some of the embodiments, the content-related image parts are highlighted and the user is enabled to select a preferred color reproduction, whereas in other embodiments the content-related image parts are individually shown to the user who selects a preferred color reproduction for each content-related image part.

It should also be mentioned that in the embodiments in which the test images are segmented, the selection of preferred color reproductions may be obtained by providing the user with a set of color reproductions based on default color mappings or enabling the user to select a preferred color reproduction from a continuous set of color reproductions, for instance by means of shifting a slider.

In some of the embodiments in which content-related color mappings are determined, an image to be reproduced is segmented into its content-related image parts, then the content-related color mappings determined by means of the test images are individually applied to the content-related image parts.

In other embodiments, in which user-specific content-related color mappings are determined, an image to be reproduced is segmented into its content-related image parts. Then, by means of weighting factors determined by segmenting the image to be reproduced into its content-related image parts, a single color mapping is determined which integrates the user-specific content-related color mappings, determined by means of the test images, according to the weighting factors. This single color mapping is then applied to the whole image to be reproduced.

In some of the embodiments, content-related image parts are for instance, text, foreground and background of an image, whereas in other embodiments, content-related image parts may also include memory color objects. A memory color object is an object in an image having a color which appears in nature, such as the skin of a person, the sky, trees and plants. It has been established that people have high expectations with regard to the reproduction of these objects. Therefore, photographic images may be further analyzed to isolate memory color objects. Memory colors, sometimes also referred to as reference colors, are colors that occur in nature, such as skin tones, green grass, or blue sky. The color reproduction of these colors matters more than the reproduction of other colors because the user has a strong memory of them and it is important to reproduce them according to the user's color preferences of the user. Memory color objects are identified by detector algorithms and for each type of memory color object a color mapping is determined.

In some of the embodiments, the color mappings are represented in the form of lookup tables (LUTs), whereas in other embodiments, the color mappings are represented by in the form of a matrix representing a linear mapping.

In some of the embodiments, the color mappings are determined by printing on different types of media with different print modes. The user is hence enabled to determine her/his preferred color reproductions for as many print mode and media combinations as he/she wishes. This feature is motivated due to the fact that color reproduction of images also depends, for instance, on the paper on which the image is printed.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

Returning now to FIG. 1 which shows an IT infrastructure including a personal computer 1, to which a color inkjet printer 2 is connected. Further, a color monitor 3 is connected to the personal computer 1, as well as a color scanner 4 and a digital color camera 5. The color monitor 3 and the color printer 2 are referred to as output devices whose color reproduction is to be adapted according to the preferences of a user. Images, which are reproduced by the monitor 3 and the printer 2 are captured by the scanner 4 or the digital camera 5. However, any other images, which have not been captured by the scanner 4 or the digital camera 5 may likewise be displayed on the color monitor 3 or printed with the color printer 2 in accordance with the personal color preferences of the user. The digital camera 5 and the scanner 4 are referred to as input devices. These input devices, the scanner 4 and the digital camera 5, operate in an RGB color system, which means that they deliver RGB color values for specifying color. Concerning the output devices, the color monitor 3 also operates in an RGB color space. Although the scanner 4, the digital camera 5 and the color monitor 3 operate in an RGB color space, these color spaces are slightly different so that a conversion from one RGB color space to another is necessary when faithful color reproduction is required. The printer 2 operates in a CMYK color space which means that a conversion from a three-dimensional RGB color space into the four-dimensional CMYK color space of the printer 2 has to be performed in order to guarantee faithful color reproduction. Each imaging device 2, 3, 4, 5 features a device-dependent LUT 6 which is responsible for the color space transformations needed for faithful color reproduction. In the example, the device-dependent LUTs 6 are stored inside firmware of the imaging devices 2, 3, 4, 5. LUT 6.2 of the digital camera 5 represents a profile which defines a transformation from the device-dependent RGB color space of the camera 5 into a device-independent CIE XYZ color space. LUT 6.1 of the scanner 4 represents a profile which defines a transformation from the device-dependent R"G"B" color space of the scanner 4 into the device-independent CIE XYZ color space. Device-dependent LUT 6.3 of the monitor 3 transforms from the device-independent CIE XYZ color space into the device-dependent R'G'B' color space and device-dependent LUT 6.4 of the color printer 2 transforms from the device-independent CIE XYZ color space into the CMYK space of the color printer 2. Further, the monitor 3 features a set of nine default LUTs 7.1.0-7.1.8 which are used to determine a user-specific LUT 8.1 which is additionally applied to the device-dependent LUTs 6 to obtain an adaptation of the faithful color reproduction according to the user's preferences. The color printer 2 also has a set of nine default LUTs 7.2.0-7.2.8 by means of which a user-specific LUT 8.2 is determined which reflects the color preferences of the user. It should be mentioned that the LUT's 6, 8 may also be incorporated as part of the driver software of the corresponding input or output device.

Figure 2A:
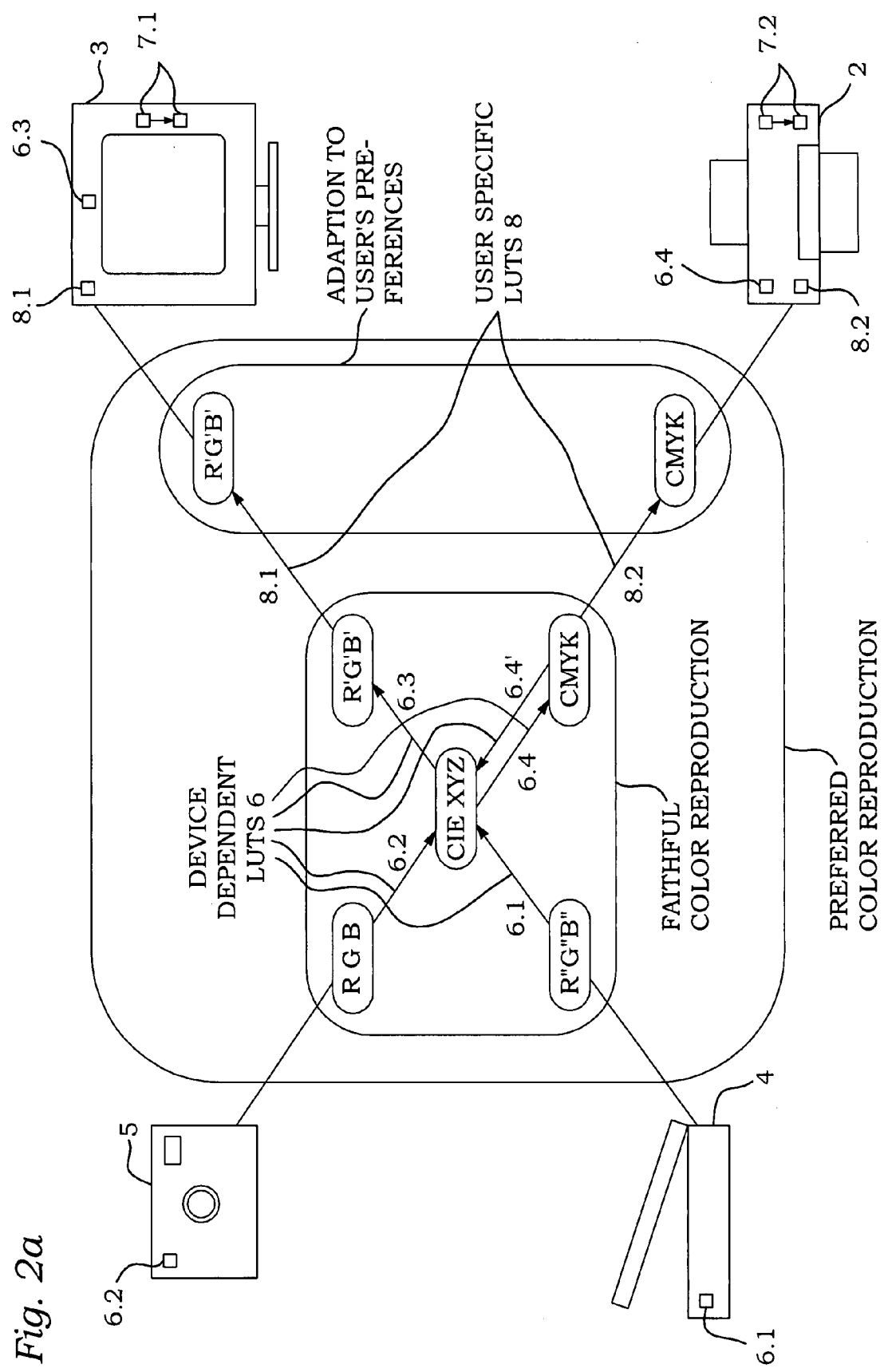
FIG. 2a illustrates a combination of faithful color reproduction and adaptation of color reproduction according to a user's color preference, according to embodiments of the invention.

FIG. 2a illustrates how personalized color reproduction is achieved in the computer infrastructure of FIG. 1. Generally speaking, preferred color reproduction is a combination of faithful color reproduction by means of device-dependent LUTs 6 and a downstream application of a user-specific LUT 8 which performs the adaptation of the faithful color reproduction according to the user's preferences. The device-dependent RGB values of the digital camera 5 or the scanner 4 (operating in the R"G"B" color space) are transformed via device-dependent LUT 6.2 or 6.1 into a device-independent CIE XYZ color space. From the CIE XYZ color space, the LUT 6.3 of the color monitor 3, respectively the LUT 6.4 of the inkjet printer 2 are applied to perform a transformation into the R'G'B' color space associated to the monitor 3 or to perform a transformation into the CMYK color space associated to the inkjet printer 2. After these transformations have occurred, the colors are faithfully reproduced by the corresponding output devices 2, 3. However, in order to obtain a preferred color reproduction, user-specific LUTs 8 which are determined, by means of the set of default LUTs 7 (as will be explained below), stored inside firmware of the output devices 2, 3 are applied. The LUTs 6.3 and 8.1 (6.4 and 8.2, respectively) are consecutively applied to an image. Therefore, the two LUTs 6.3 and 8.1 may also be substituted by one LUT. The same applies to LUTs 6.4 and 8.2. Furthermore, it should be mentioned that the input devices 4, 5 are needed for capturing or entering an image. However, if an image is already available within the personal computer 1, then these input devices 4, 5 are not required.

Incidentally, a LUT 6.4' is provided which represents the reverse color mapping of LUT 6.4. LUT 6.4' is used in embodiments, in which the color reproduction of the printer 2 is simulated by the color monitor 3.

Figure 2B:
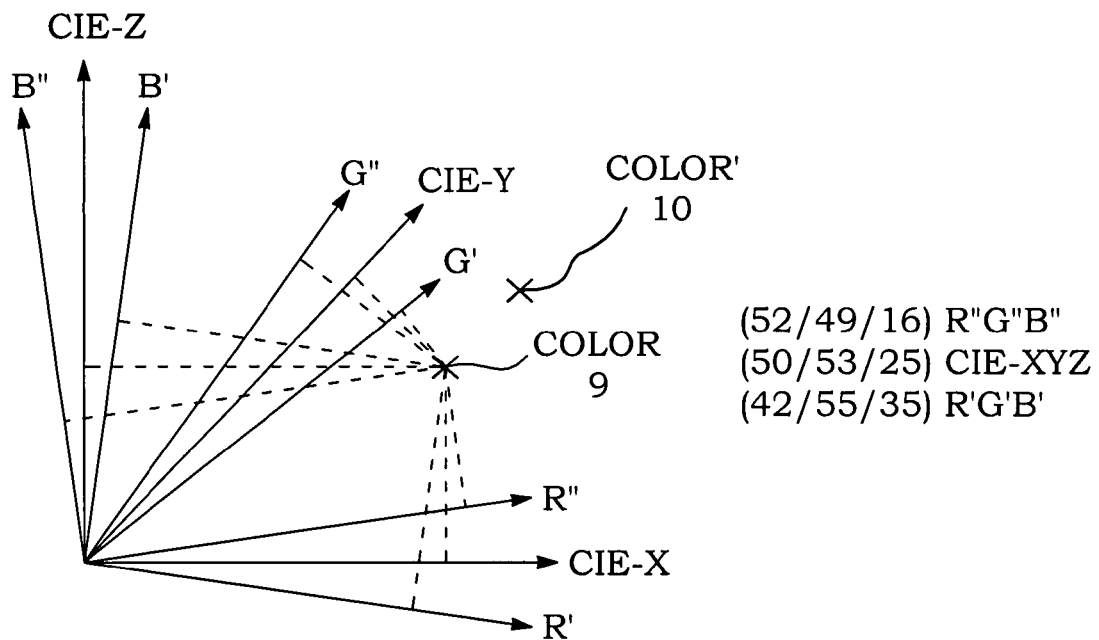
FIG. 2b illustrates principles of faithful color reproduction.

FIG. 2b illustrates the mathematical principles of faithful color reproduction. The scanner 4 perceives the image to be scanned with its sensors and generates device-dependent values in its associated R"G"B" color space. In the given embodiment, the scanner 4 perceives an exemplary color 9 and generates the coordinates of the color with regard to its color space. In the R"G"B" color space of the scanner 4, this color has coordinates (52/49/16). If the monitor 3 were to display the scanner-dependent R"G"B" values, the colors would not be displayed faithfully, since the monitor 3 interprets the R"G"B" values delivered by the scanner 4 differently. The coordinates (52/49/16) in the coordinate system associated with the monitor 3 (R'G'B' coordinate system) is color' 10, so that faithful color reproduction is distorted. To circumvent this distortion, the scanner 4 is calibrated, which means that it has a device-dependent LUT 6.3 stored inside its firmware which is able to transform the scanner-dependent R"G"B" values into the corresponding values of the CIE XYZ color system. The coordinates (52/49/16) in the R"G"B" color space correspond to the same color as the coordinates (50/53/25) in the CIE XYZ color space. The device-dependent LUT 6.1 of the scanner 4 is therefore conceived as a corrective which adjusts the perceived device-dependent R"G"B" values to device-independent CIE XYZ values. As the color monitor's 3 R'G'B' color space is also different from the CIE XYZ color space, the monitor 3 has a device-dependent LUT 6.3 inside its firmware which transforms coordinates from the CIE XYZ color space into coordinates of the device dependent R'G'B' color space while preserving color. The color referred to by the coordinates (50/53/25) in the CIE XYZ color space is equal to the color referred to by the coordinates (42/55/35) in the R'G'B' color space. It should be mentioned that the CIE XYZ color space is defined as a standard color space (reference color space) to which most device-dependent LUTs 6 of imaging devices refer. From a mathematical point of view, however, any color space can be used as a reference color space. In many embodiments, the CIE LAB color space is used since it provides a perceptually uniform color space which means that if one calculates the average between two points given in the CIE LAB color space, the average color will be perceived in fact, as being in the middle of the two colors. Incidentally, since the gamuts of the scanner 4 and the color monitor 3 are not the same, there are colors which may be measurable by the scanner 4, but not displayable by the monitor 3. Accordingly, a faithful color reproduction is only possible with regard to colors covered by both gamuts.

Figure 2C:
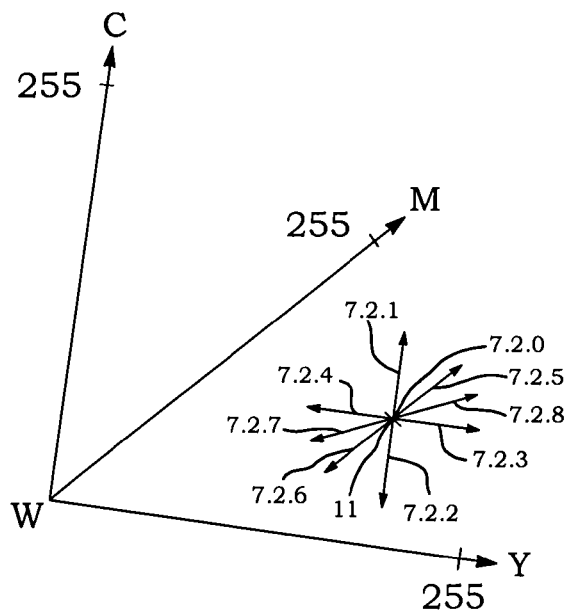
FIG. 2c illustrates principles of adaptation of color reproduction to a user's color preference, according to embodiments of the invention.

FIG. 2c shows mathematical principles of adaptation of color reproduction to a user's color reproduction preferences. In a color processing system providing preferred color reproduction, faithful color reproduction is performed as a first step. In a second step, an output device capable of preferred color reproduction further features a user-specific LUT 8 which performs color shifts in the color space of the output device so that the images are output in color tints. FIG. 2c shows the 24-Bit CMY color space of the printer 2 (the fourth component "K" is not considered in this example). Eight shifts are applied to an exemplary color 11 in the CMY color space of the printer 2, whereby six shifts (represented by LUTs 7.2.1-7.2.6) refer to translations in directions parallel to the axes of the CMY coordinate system, leading to different color tints of images. Two translations (represented by LUTs 7.2.7 and 7.2.8) represent color shifts along the diagonal from (0/0/0) to (255/255/255) which refer to a change in lightness (a shift towards (0/0/0) renders the image lighter, whereas a shift towards (255/255/255) renders the image darker). The current selection of color transformation is the point in the middle. When applying LUT 7.2.4 (in addition to the LUTs 6 for faithful color reproduction) to the image, then the blue channel is increased by an offset of 25, so that the image is displayed in a blue color tint. When applying LUT 7.2.3, then the blue channel is decreased by an offset of 25, entailing that the complementary color of blue, which is yellow, becomes stronger, so that an image is displayed in a yellow color tint. Applying LUT 7.2.2 means increasing the red channel by 25, whereas LUT 7.2.1 decreases the red channel by 25, which entails that an image is displayed with a color tint of the complementary color of red, namely with a cyan color tint. Applying LUT 7.2.5 increases the magenta channel by 25, whereas LUT 7.2.6 decreases the magenta channel by 25, so that the image is displayed with a green color tint. By increasing and decreasing the individual color channels, color tints of the original image are obtained which provide variations of the faithful color reproduction and offer a selection of color reproductions from which the user chooses her/his preferred color reproduction for each image out of a set of test images. By doing this, he/she defines a user-specific LUT 8 which reflects her/his personal color preferences. It should be mentioned that if a user wants to personalize the color reproduction of the printer 2, then she/he selects the preferred color reproduction on the basis of printouts of images and not what she/he sees in a display in which she/he makes her/his selections since the printer 2 and the color monitor 3 reproduce color differently. However, the color monitor 3 may be enabled to simulate the printer 2 so that the color monitor 3 reproduces colors in exactly the same way as printed by the printer 2. In theses cases, the user may select her/his preferred color reproductions on the basis of what she/he sees on the color monitor 3. To this end, a LUT 6.4' (see FIG. 2a) is provided (which is the inverse of LUT 6.4.) which is responsible for mapping from the CMYK color space of the color printer 2 to the device-independent CIE XYZ color space. After adaptation of the output device to the color preferences of a user has been completed, the determined user-specific LUT 8 is applied additionally to the LUTs 6 which are responsible for faithful color reproduction, when reproducing images.

FIG. 3 shows the device-dependent LUTs 6, the default LUTs 7 and the user-specific LUTs 8 which are stored inside firmware of input devices 4, 5 and output devices 2, 3. The LUT 6.1 defines the profile of the scanner 4 and indicates how R"G"B" values perceived by the scanner 4 correlate with colors in the CIE XYZ color space. This table does not provide a mapping for all possible input values because of storage space restrictions. If a value is perceived which is not stored in input data points 35, then interpolation is used to map this input value onto an approximated output value. The LUT 6.2 defines the profile of the digital camera 5 and indicates how RGB values of the digital camera 5 are mapped onto points in the CIE XYZ color space. The LUT 6.3 defines a mapping from the CIE XYZ color space into the R'G'B' color space of the monitor 3 and the LUT 6.4 defines a mapping from the CIE XYZ color space into the CMYK color space of the printer 2. The LUTs 7.1 represent transformations within the color space of the color monitor 3. They shift colors in the R'G'B' color space of the monitor 3 by an offset, and thereby depart from faithful color reproduction and produce color tints on the images. It should be mentioned that LUT 7.1.0 refers to an identical mapping, which does not alter the color reproduction, i.e. refers to a faithful color reproduction. LUTs 7.1.1-7.1.8 refer to a color shift in the color reproduction. These color LUTs 7.1.1.-7.1.8 are used for determining a personalized color reproduction of the color monitor 3. However, in the following, only personalizing of printer output will be further discussed.

Similarly, the LUTs 7.2 represent transformations in the CMYK color space of the printer. They shift colors in the CMYK color space of the printer 2 and produce color tints on the images. The user is enabled to select color tints for a set of test images according to her/his preferences and thereby defines a user-specific LUT 8.

Figure 4:
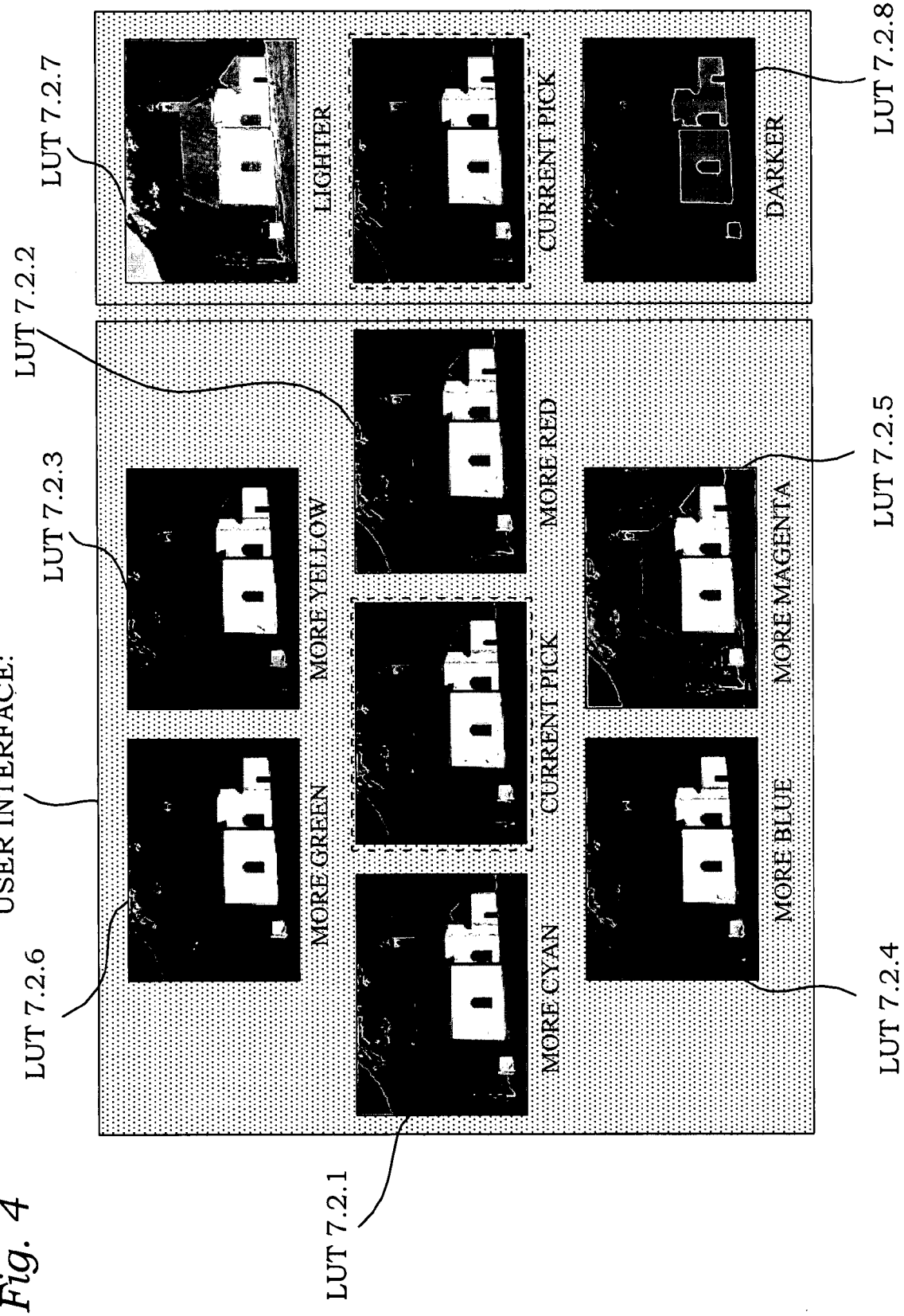
FIG. 4 shows a user interface for selecting color reproductions of a test image from a set of default color reproductions, according to embodiments of the invention.

FIG. 4 illustrates an exemplary user-interface by means of which a user selects preferred color reproductions of a test image. In the middle, the test image is shown in its currently selected preferred color reproduction (current pick). (Initially, the current pick is the image in a faithful color reproduction.) The images, arranged around it in a star-like manner, show the same test image in different color tints which are obtained by applying one of the LUTs 7.2.1-7.2.8 to it, whereby color reproductions referring to color tints of complementary colors are arranged in opposite directions. On the right-hand side, the test image is shown after applying LUT 7.2.7 (which renders the test image lighter) or after applying LUT 7.2.8 (which renders the test image darker) to it. If a user selects one of the shown color-tinted test images, then the selected color-tinted test image is shown in the middle (as the current pick) and around it the corresponding color-tinted reproductions are displayed with regard to the currently selected color tint of the test image. Hence, a user may navigate in the color space by iteratively selecting one of the shown color reproductions according to her/his preferences. It should be mentioned that not all translations are obtainable since the user can navigate only in default offset steps, such as an offset of 25 in this example.

First Approach: Fixed Images

Figure 5:
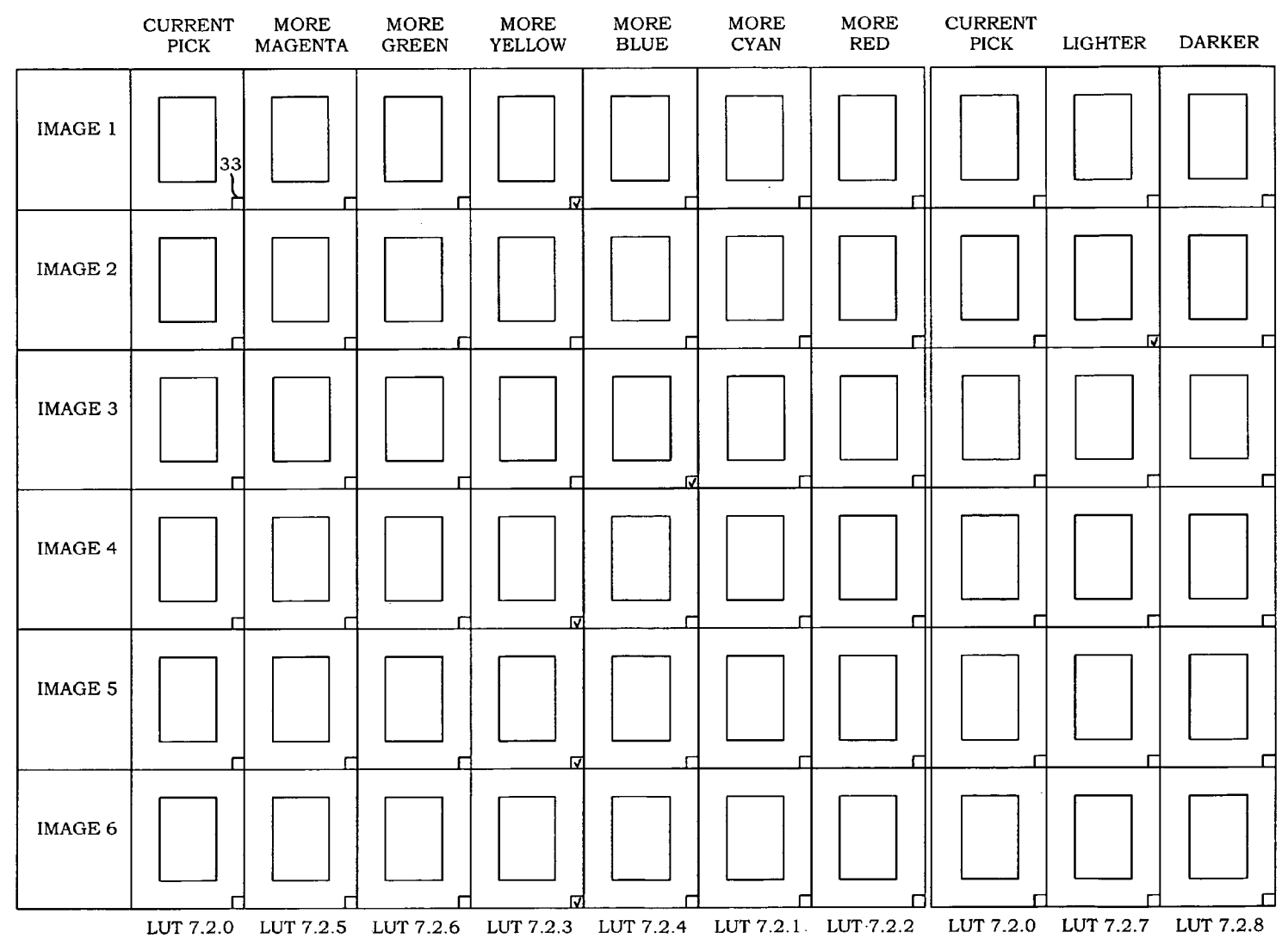

FIG. 5 shows a first approach of obtaining a user-specific LUT 8.2 for the color printer 2 for personalized color reproduction. FIG. 5 schematically shows a selection of color reproductions applied to a set of test images (images 1 to 6). The user is shown six bitmap images, each of which is represented in nine different color reproductions, whereby each color reproduction corresponds to the result of applying one of the nine default LUTs 7 (in addition to the device-dependent LUTs 6 which are responsible for faithful color reproduction) to one of the images. (Normally, the user is not shown the different color reproductions at the same time. Rather, the user is consecutively shown the different color reproductions of each test image, as shown in the user interface of FIG. 4.) In this first approach of determining a user-specific LUT 8, a set of images is supplied by the output device manufacturer, which means that they are fixed. The first column represents each of the test images in its current color reproduction. Initially, before translating the color reproduction in the color space, this corresponds to a faithful color reproduction (which means that only the device-dependent LUTs 6 are applied plus an identical color reproduction LUT 7.2.0). The six columns right of the first column represent each test image in color reproductions which produce color tints of the test images such as green, yellow, red, blue, cyan and magenta. These tints are produced by shifting the color of each pixel by a predefined offset (as shown in FIG. 2c) into different directions in the color space. These color reproductions are therefore not faithful any more, but are used to figure out the user's color preferences. It should be mentioned that the user may consecutively select one of the color reproductions so that the color of the pixel is shifted several times in the corresponding direction by the offset. In terms of the default LUTs 7.2, this means that they are also consecutively applied to the test image. The seven leftmost columns represent variations in color reproductions, whereas the two rightmost columns represent variations in brightness. The user chooses whether he/she wishes to have the color reproductions lighter or darker than the faithful reproduction. The user goes through all the test images and selects for each test image one color reproduction which reflects her/his preferences in terms of color/brightness reproduction best. It should be mentioned that if a color printer 2 is to be calibrated in terms of preferred color reproduction, the selection of the test images in their different color reproductions is performed not on the basis of the color reproductions shown on a monitor on which the user selects her/his preferred color reproductions of the test images, but the user selects her/her preferred color reproduction rather on the basis of printouts of the corresponding color reproductions. A selection of test images for calibrating a printer 2 is only performed on the basis of what is shown on the color monitor 3 if the color monitor 3 is able to simulate the color printer 2, which means that the color monitor 3 shows the color reproductions exactly in the same way as they would be printed by the color printer 2. The user gives her/his selection by clicking on the corresponding icons 33. After the user has ascertained her/his color preference for each test image, the default LUTs 7.2 corresponding to the user's selections are combined into one user-specific LUT 8.2. In the example, calculating the combination of selected default LUTs 7.2 is calculating an average of all LUTs 7.2 selected for the individual test images. This user-specific LUT 8.2 in combination with the device-dependent LUTs 6 that guarantee faithful color reproduction correspond to the color transformation which is applied during regular operation of the color printer 2. It should be mentioned that different test images are provided with different content-related image parts, so that the determined user-specific LUT 8.2 includes information of the color reproduction of many different images with content-related image parts.

As color reproduction also depends on the print media and print mode, different user-specific LUTs 8.2 are determined for different media (different types of paper) and print mode combinations.

Second Approach: Personal Images

Figures 6A, 6B:
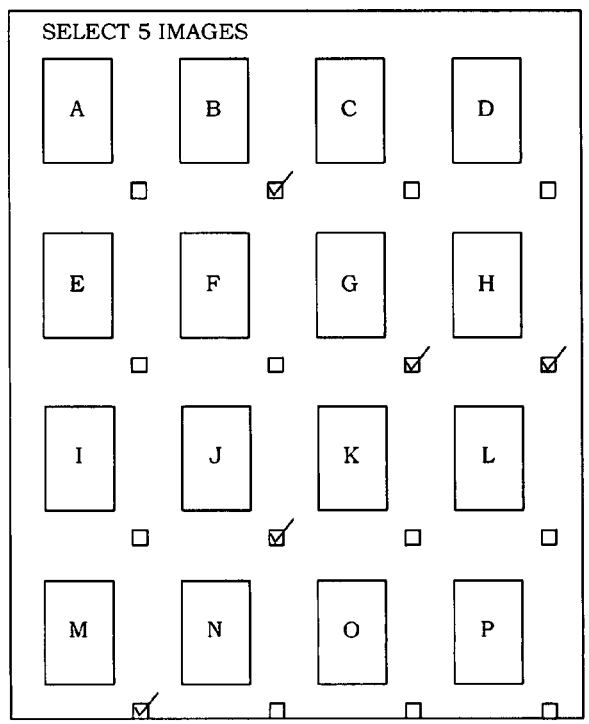
FIG. 6a shows a user interface by means of which a user selects personal test images, according to embodiments of the invention.
FIG. 6b schematically illustrates selection of color reproductions of different personal test images, according to embodiments of the invention.

In FIGS. 6a and b, a further approach of determining a user-specific LUT 8.2 for the color printer 2 is illustrated. FIG. 6a shows a graphical user interface, in which the user is asked to make a choice among personal test images (A-P) which she/he wants to use for determining a user-specific color mapping 8.2 according to her/his color preferences. Similarly to FIG. 2, the test images are displayed after device-dependent LUTs 6 guaranteeing faithful color reproduction and default LUTs 7.2 representing shifts in the color space have been applied to them. The user selects the color reproduction of each test image that reflects her/his color preferences best. All selected color reproductions, whereby each color reproduction corresponds to a default LUT 7.2 (or a consecutive application of default LUTs 7.2), are combined into one user-specific LUT 8.2 which is used in further operation of the printer 2 in addition to the device-dependent LUTs 6, that guarantee faithful color reproduction, to obtain a personalized color reproduction. Enabling the user to provide personal test images for determining a preferred color reproduction is advantageous since it permits to determine a user's preferred color reproduction on a basis of test images to which the user has a relation (since for example the user has captured them or likes them).

FIG. 6b shows the selected personal images (B, G, H, J, M) displayed in different color reproductions on the monitor 3 and a selection of color reproductions that the user has selected by clicking on different icons 33.

In FIGS. 5 and 6, the user is enabled to select color reproductions of test images by navigating in default steps through the CMY color space. In the embodiment shown in FIG. 7, however, the user selects color reproductions of test images by shifting several sliders and thereby adjusting her/his preferred color reproduction of a set of test images (either personal test images or fixed test images provided by the manufacturer). Three images are provided and the user adjusts the sliders of the sliding bars according to her/his preferences. Thereby, she/he opts for a preferred color reproduction for each of the three test images from a continuous set of color reproductions. By shifting the sliders, the color reproductions of the test images change. The changes correspond to translations in the CMY color space as shown in FIG. 2c. The difference to the color reproduction selection shown in FIG. 4 is that a user may select from a continuous set of color mappings rather than selecting from a color mapping by traversing the CMY-color space in default steps as shown in FIG. 4.

Third Approach: Color Mappings for Segmented Content-Related Image Parts

Figure 8:
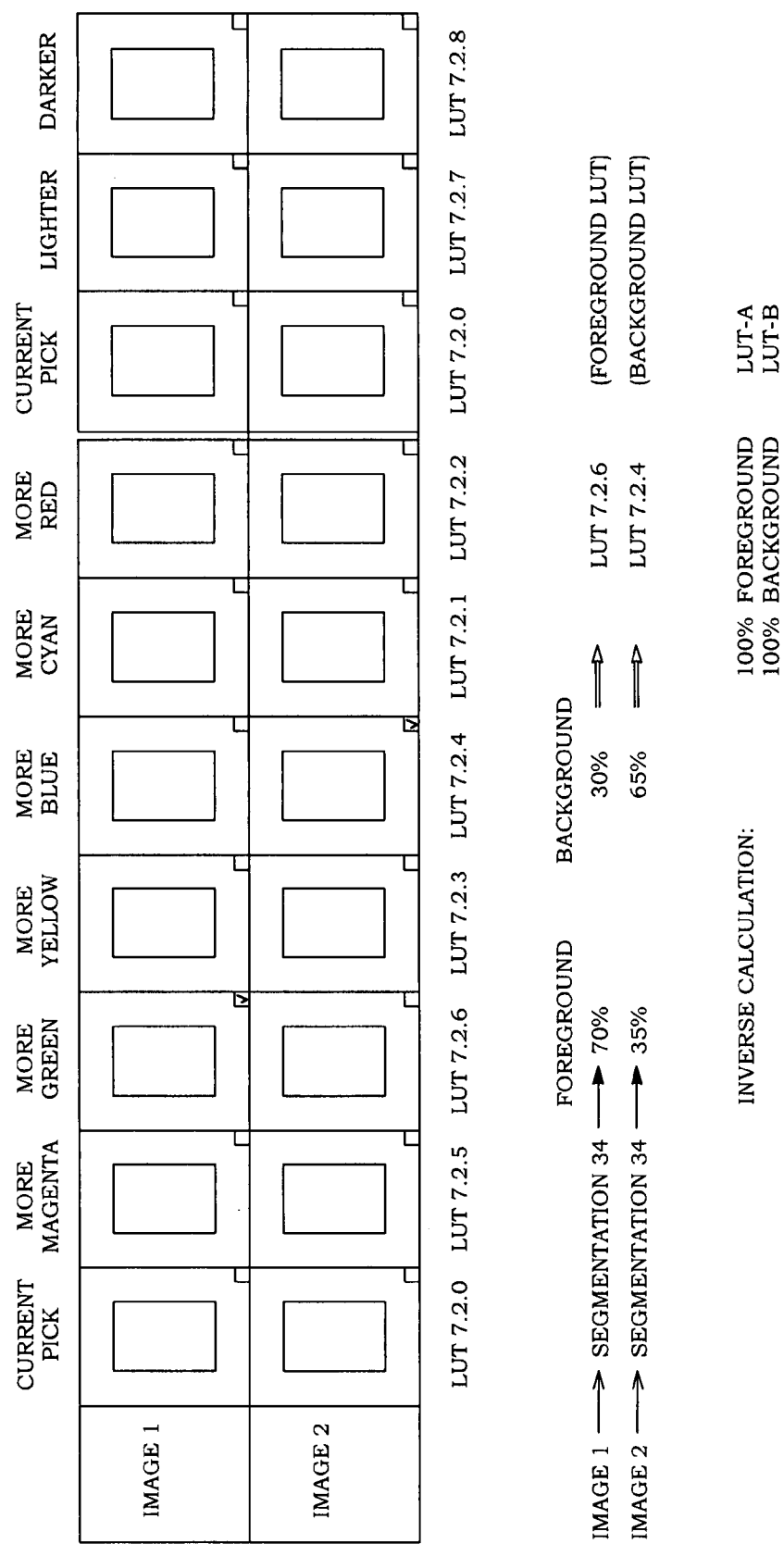
FIG. 8 shows an exemplary embodiment, in which test images are internally segmented according to different content-related image parts, and a user individually selects color reproductions of personal test images as a whole, according to embodiments of the invention.

FIG. 8 shows an approach of determining content-related color mappings for personalized color reproduction. In this approach, a user individually selects a color reproduction for each test image (as a whole) of a set of test images. Internally, however, the test images (Image 1 and 2) are segmented into their content-related image parts. Segmentation 34 into different content-related image parts, such as text and lines, background, foreground, photographic image, is achieved by the methods disclosed in US2005/0073719 "Color Image Processor". (It should be mentioned that in some of the embodiments, the different content-related image parts may also refer to memory color objects. As mentioned above, memory color objects are parts of an image which refer to natural colors. The user wishes these memory color objects to be reproduced in a natural way.) In the example, the user selects LUT 7.2.6 for image 1, which has 70% of foreground image parts (70% of the area of image 1 is covered with foreground) and 30% of background image parts (30% of the area of image 1 is covered with background). The user selects LUT 7.2.4 for image 2, which has 35% of foreground and 65% of background image parts. Therefore, LUT 7.2.6 is determined to be a user-specific color mapping 8.2 for foreground (since in image 1, foreground predominates) and LUT 7.2.4 is determined to be a user-specific color mapping 8.2 for background (since in image 2, background predominates).

Alternatively, by means of inverse calculation based on solving a system of linear equations, a user-specific color mapping 8.2 (LUT-A) is determined which corresponds to a color mapping for 100% of foreground and 0% of background and a user-specific color mapping 8.2 (LUT B) which corresponds to a color mapping for 0% of foreground and 100% of background.

Figure 9:
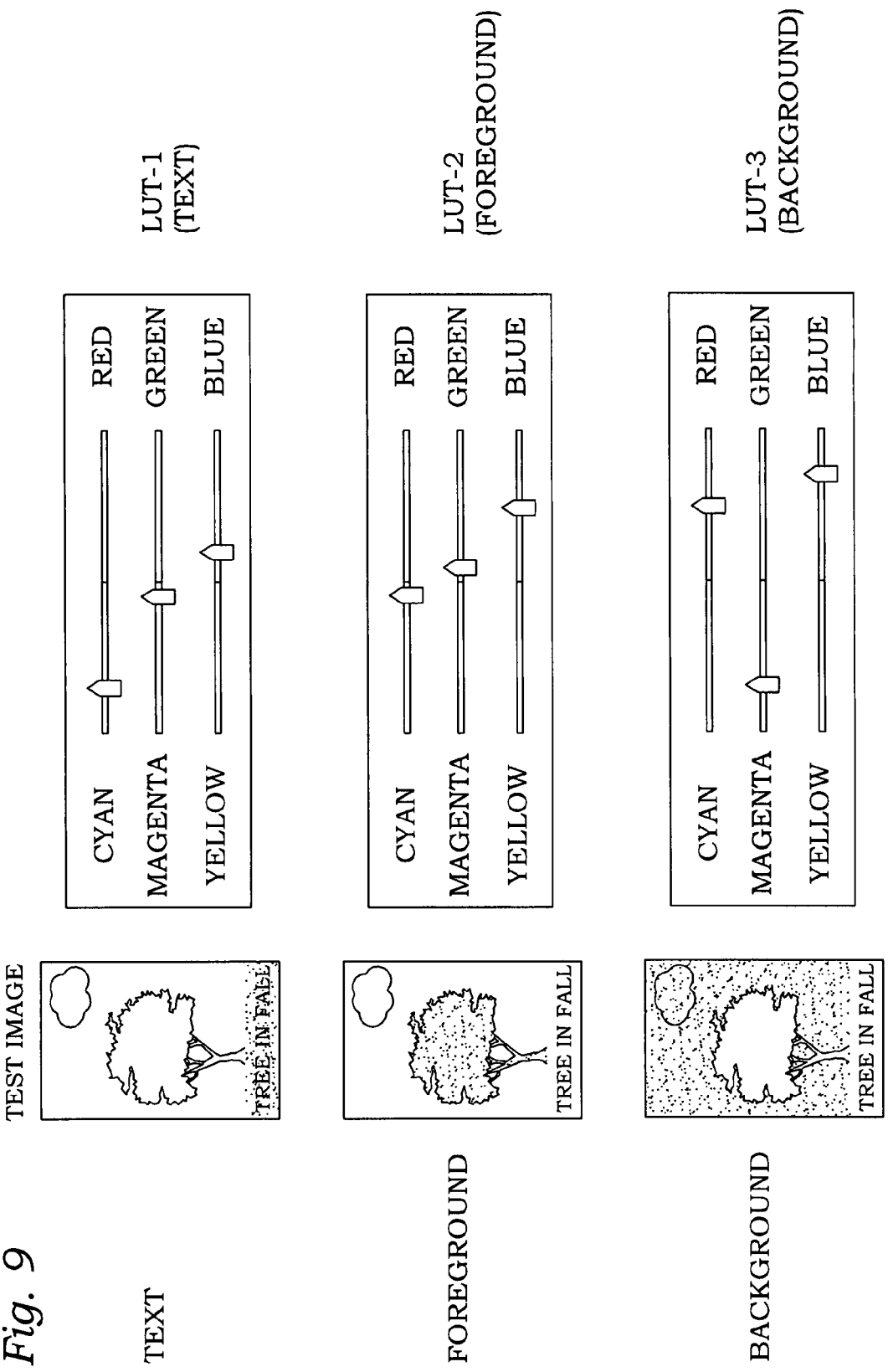
FIG. 9 illustrates an exemplary embodiment, in which an image is segmented in its content-related image parts, the content-related image parts are highlighted and a user individually selects color reproductions for the content-related image parts by means of sliders, according to embodiments of the invention.

Fourth Approach: Highlighting Content-Related Image Parts and Individually Selecting Preferred Color Reproductions for Content-Related Image Parts FIG. 9 illustrates another approach for determining content-related color mappings for personalized color reproduction. In this approach, only one test image is required. The different content-related image parts are determined by means of a zoning or segmentation analysis tool, such as US 2005/0073719. Consecutively, the different content related-image parts are highlighted (dotted parts of the image) and a user determines for each content-related image part her/his preferred color reproduction by shifting sliders, depicted on the right-hand side of the illustration. In this approach, the user is aware of the segmentation, since she/he individually selects her/his preferred color reproductions for each content-related image part. In the example, the user-specific color mapping 8.2 determined for text is represented by LUT-1. The user-specific color mapping 8.2 determined for foreground is represented by LUT-2 and the user-specific color mapping 8.2 for background parts of the image is represented by LUT-3. It should be mentioned that also in this approach, selecting the user-specific color mappings 8.2 may be obtained by enabling a user to select her/his preferred color reproduction for each content-related image part from a set of default color reproductions, as shown for example in FIG. 5.

Reproduction of Images:

In the embodiments shown in FIGS. 5, 6 and 7 (first and second approach), only one user-specific color mapping 8.2 is obtained which is applied to the whole image to be reproduced. Therefore, the image to reproduced does not have to segmented.

In the embodiments shown in FIGS. 8 and 9 (third and fourth approach), user-specific color mappings 8.2 are determined with reference to individual content-related image parts. Principally, there are two ways of applying the determined user-specific color mappings 8.2 to an image to be reproduced as shown in FIGS. 10*a* and *b:*

Figure 10A:
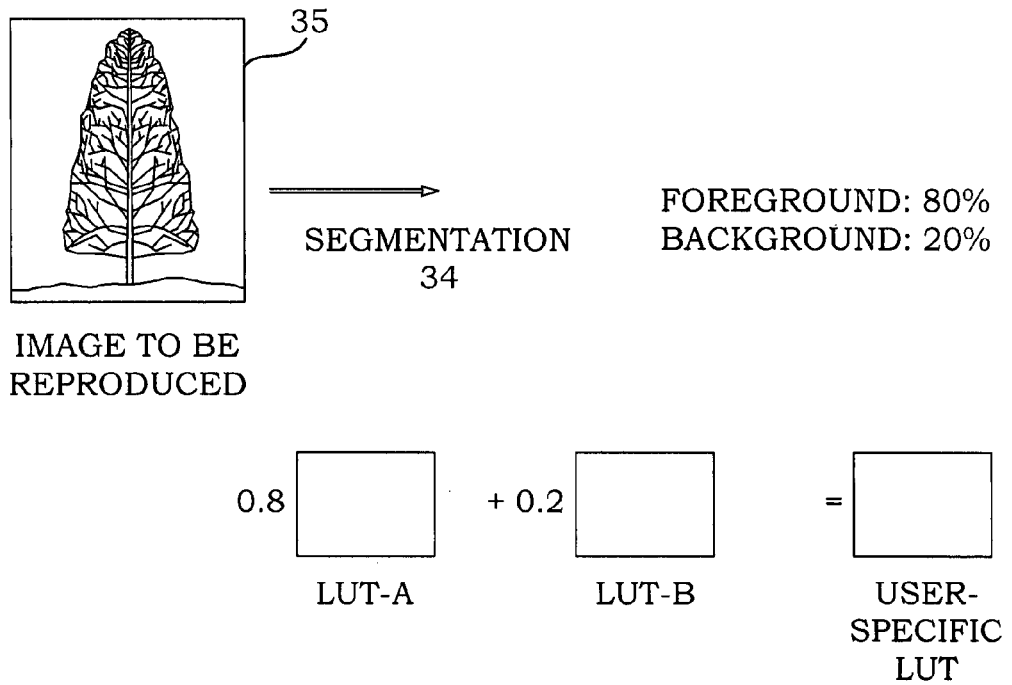
FIG. 10a shows applying a color mapping based on content-related color mappings to an image to be reproduced by means of weighting factors, according to embodiments of the invention.

FIG. 10*a* illustrates one way of applying the user-specific color mappings 8.2 LUT-A (100% foreground) and LUT-B (100% background) as determined in FIG. 8 to an image which is to be reproduced. (Of course, the LUT-1, LUT-2 and LUT-3 determined in FIG. 9 may be used in the same way for reproduction.) If, for example, an image 35 is to be reproduced which has 80% of foreground and 20% of background (which is found out by segmentation 34 of the image to be reproduced), then a user-specific LUT 8.2 may be determined which is a combination of 80% of LUT-A and 20% of LUT-B. This user-specific LUT 8.2 is then applied to the whole image to be reproduced.

Figure 10B:
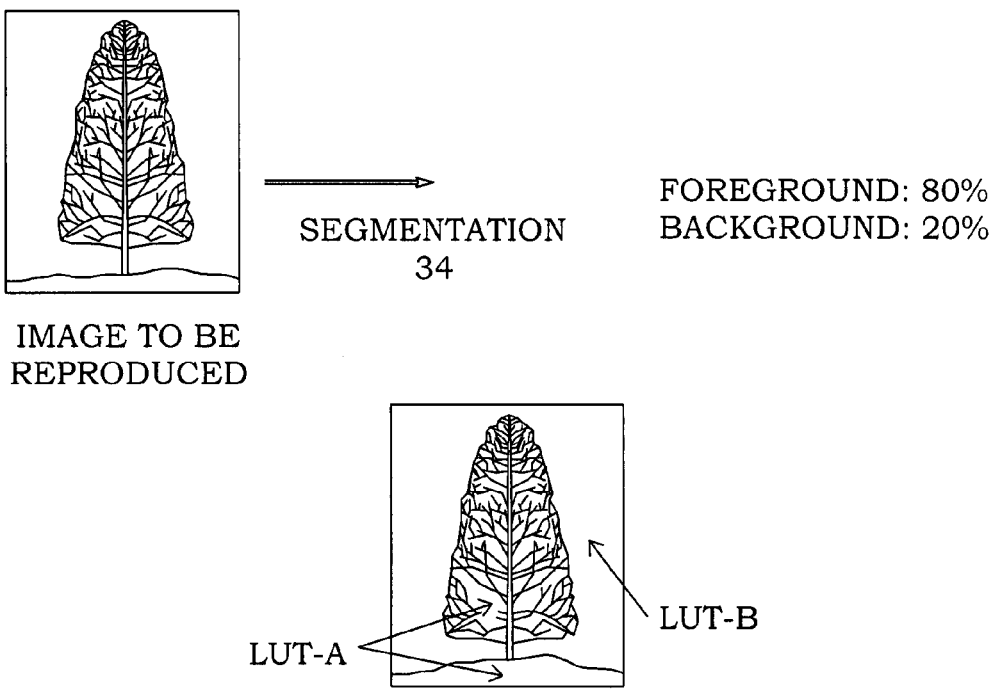
FIG. 10b shows applying different content-related color mappings to corresponding content-related image parts of an image to be reproduced, according to embodiments of the invention.

In FIG. 10*b*, another approach is illustrated. The image to be reproduced is segmented according to its content-related image parts, and LUT-A (which corresponds to a reproduction for 100% of foreground) is exclusively applied to the foreground image parts of the image to be reproduced and LUT-B (which corresponds to a reproduction for 100% of background) is exclusively applied to background image parts of the image to be reproduced.

Figure 11:
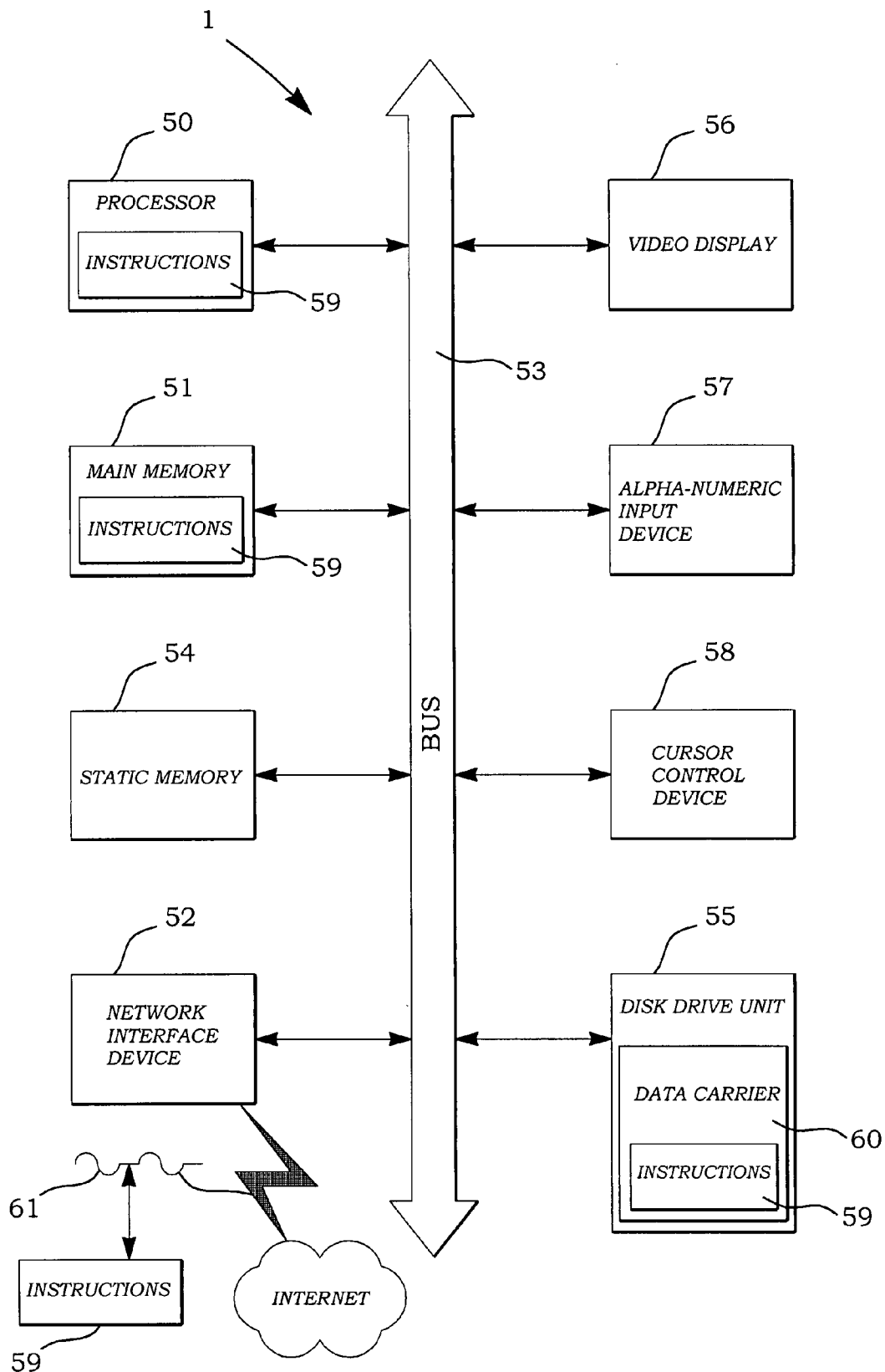
FIG. 11 is a diagrammatic representation of an embodiment of a computer for personalizing color reproduction.

FIG. 11 is a diagrammatic representation of a computer system which provides the functionality of a computer system for personalizing color reproduction and is therefore denoted as "personalizing color reproduction computer system 1,". Within the personalizing color reproduction computer system 1 a set of instructions to cause the computer system to perform any of the methodologies discussed herein, may be executed. The personalizing computer system 1 includes a processor 50, a main memory 51 and a network interface device 52, which communicate with each other via a bus 53. Optionally, it may further include a static memory 54 and a disk-drive unit 55. A video display 56, an alpha-numeric input device 57 and a cursor-control device 58 may form a user interface for personalizing color reproduction. The network interface device 52 connects the personalizing color reproduction computer system 1 to the Internet. A set of instructions (i.e. software) 59 embodying any one, or all, of the methodologies described above, resides completely, or at least partially, in or on a machine-readable medium, e.g. the main memory 51 and/or processor 50. A machine-readable medium on which the software 59 resides may also be a data carrier 60 (e.g. a non-removable magnetic hard disk or an optical or magnetic removable disk) which is part of disk-drive unit 55. The software 59 may further be transmitted or received as a propagated signal 61 via the Internet through the network interface device 52.

Thus, the embodiments of the invention described above enable a user to personalize color reproduction by selecting preferred color reproductions of one or more test images.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of personalizing color reproduction of an output device by determining a user-specific color mapping, the method comprising:
    enabling a user to individually select different color reproductions of a plurality of different test images according to the user's preferences, wherein the different color reproductions are associated with different color mappings,
    the test images being reproduced by said output device or a display device simulating said output device, and
    determining the user-specific color mapping by combining the color mappings of the selected color reproductions.

2. The method of claim 1, wherein the test images are reproduced by applying different default color mappings to them.

3. The method of claim 1, wherein enabling a user to individually select color reproductions of a plurality of different test images according to the user's preferences comprises enabling the user to individually select the user's preferred color reproductions from a continuous set of color reproductions.

4. The method of claim 1, wherein the test images are fixed images.

5. The method of claim 1, wherein the test images are personal images of the user.

6. A computer program product comprising a non-transitory machine-readable medium with program code stored on it,
    wherein the program code is arranged to carry out a method, when executed on a computer system, of personalizing color reproduction of an output device by determining a user-specific color mapping, the method comprising:
    enabling a user to individually select different color reproductions of a plurality of different test images according to the user's preferences, wherein the color reproductions are associated with different color mappings,
    the test images being reproduced by said output device or a display device simulating said output device, and
    determining the user-specific color mapping by combining the color mappings of the selected color reproductions.

7. A method of personalizing color reproduction of an output device by determining user-specific content-related color mappings, said method comprising:
    segmenting a plurality of test images into their respective content-related image parts,
    enabling a user to individually select preferred color reproductions of the plurality of test images according to said user's preferences,
    said plurality of test images being reproduced by said output device or a display device simulating said output device, and
    individually determining for the different content-related image parts a user-specific color mapping by combining color maps associated with said user's preferred color reproductions.

8. The method of claim 7, wherein
    said segmenting at least one test image into its content-related parts comprises segmenting a plurality of test images into their content-related image parts, and
    said enabling the user to select preferred color reproductions comprises enabling the user to individually select color reproductions of the plurality of test images according to the user's preferences.

9. The method of claim 8, wherein enabling the user to individually select color reproductions of the plurality of test images according to the user's preferences comprises reproducing the test images in different default color reproductions and enabling the user to individually select her/his preferred color reproductions.

10. The method of claim 8, wherein enabling the user to individually select color reproductions of the plurality of test images according to the user's preferences comprises enabling the user to individually select her/his preferred color reproductions from a continuous set of color reproductions.

11. The method of claim 7, wherein enabling the user to select preferred color reproductions comprises individually presenting the content-related image parts of the at least one test image to the user and enabling the user to individually select for the content-related image parts her/his preferred color reproductions.

12. The method of claim 11, wherein enabling the user to individually select for the content-related image parts the user's preferred color reproductions comprises individually reproducing the content-related image parts in different default color reproductions and enabling the user to individually select for the content-related image parts the user's preferred color reproductions.

13. The method of claim 11, wherein enabling the user to individually select for the content-related image parts the user's preferred color reproductions comprises enabling the user to select the user's preferred color reproductions from a continuous set of color reproductions.

14. The method of claim 7, wherein said test images are fixed images.

15. The method of claim 7, wherein said test images are personal images, provided by the user.

16. The method of claim 7, wherein an image to be reproduced is segmented into its content-related image parts and the determined content-related color mappings are applied to the respective content-related image parts of the image to be reproduced.

17. The method of claim 7, wherein an image to be reproduced is segmented into its content-related image parts and the determined content-related color mappings are integrated into one color mapping, according to weighting factors, which is applied to the image to be reproduced as a whole.

18. The method of claim 7, wherein image content parts comprise text, foreground, background, and/or memory color objects.

19. A method comprising:
for each of plural test images, generating plural reproductions of that test image using respective different test color maps;
enabling a user to select plural user-preferred reproductions from said plural reproductions, said user-preferred reproductions including at least one of said plural reproductions for each of said test images;
identifying respective selected color maps for said user-preferred reproductions, said selected color maps selected from said different test color maps;
generating a user color map as a function of said selected color maps;
receiving a source image different from said test images; and
reproducing said source image using said user color map.

20. A method as recited in claim 19 wherein said generating a user color map involves combining said selected color maps.

21. A method as recited in claim 20 wherein said combining involves calculating a weighted or unweighted average of values from said selected color maps.

22. A method as recited in claim 20 wherein said generating plural reproductions of test images involves displaying test images on a monitor so as to simulate the appearance of said test images when printed on a print medium.

23. A method as recited in claim 19 wherein said images are expressed as digital data and said reproducing said source image involves printing on a print medium.

24. A method as recited in claim 23 wherein said generating plural reproductions involves displaying said plural test images on a monitor.

\* \* \* \* \*